United States Patent [19]

Kurpanek

[11] 3,768,051
[45] Oct. 23, 1973

[54] MAGNETO-MOTIVE BISTABLE SWITCHING DEVICES
[76] Inventor: Waldemar Helmut Kurpanek, Toronto, Ontario, Canada
[22] Filed: July 21, 1972
[21] Appl. No.: 273,940

Related U.S. Application Data
[63] Continuation-in-part of Ser. No. 149,174, June 2, 1971, abandoned.

[52] U.S. Cl. ................................................. 335/153
[51] Int. Cl. ....................... H01h 51/24, H01h 51/27
[58] Field of Search .................... 335/152, 153, 154, 335/151, 179, 182, 183, 170

[56] References Cited
UNITED STATES PATENTS
3,514,728  5/1970  Ugon .................................. 335/179

Primary Examiner—Roy N. Envall, Jr.
Attorney—John C. Holman et al.

[57] ABSTRACT

A bistable relay switch comprising a hermetically sealed contact container having at least one pair of stationary contact points and one free floating ferromagnetic contactor. The contact container and an electromagnetic coil encircling the midsection of the contact container are mounted rigidly, within the magnetic flux of two rigidly mounted permanent magnets that face each other at a given distance with reciprocal poles thus forming a fully closed ring flux field that cannot be demagnetized under given operating conditions. The switch is electrically tripped by a dc trigger pulse energizing the coil. The coil and the contact points may have individual electric circuits thus permitting the switching of relative high dc or ac electrical currents across the contact points with a low voltage dc pulse. By connecting the coil and contact points in series the switch also functions as a sensitive dc overload circuit breaker.

12 Claims, 4 Drawing Figures

PATENTED OCT 23 1973

3,768,051

MAGNETO-MOTIVE BISTABLE SWITCHING DEVICES

PRIOR APPLICATIONS

This is a Continuation-in-Part application of U.S. Pat. application Ser. No. 149,174 filed June 2, 1971 now abandoned.

BACKGROUND OF THE INVENTION

The present invention relates to an electro-magnetic relay switch capable of retaining full magnetic field strength after frequent switching and extensive duration of usage.

In prior art devices it is noticeable that very little or not attention is given to the demagnetizing effects due to faulty arrangements of magnetic flux fields.

The following disadvantageous arrangements of magnetic fields are often observed:

Ordinary permanent magnets facing each other with opposing fields
  Ordinary permanent magnets mounted within an electro-magnetic coil whereby the coil produces a magnetic field of higher field strength and different directions
  Ordinary permanent magnets mounted with opposing magnetic poles within the vicinity of high current bearing wire leads
  Ordinary permanent magnets mounted within the vicinity of high frequency alternating current bearing wire leads Any one of the above conditions will demagnetize a permanent magnet. Some of the above conditions are so efficient in demagnetizing permanent magnets that industry applies them for this very purpose.

The present invention employs magnets of high magnetic retentivity such as cobalt rare-earth type, which are arranged to form a fully closed ring flux field with an electromagnetic coil situated between the permanent magnets, so that a magnetic flux field of relative low field strength is generated perpendicular to the air path of the permanent magnet's ring flux field thus continually magnetizing one permanent magnet per one switching mode respectively and retaining the permanent magnets at their magnetic saturation point.

Due to this novel construction a magnetic relay switch utilizing permanent magnets which after prolonged usage retain full magnetic field strength, has been realized.

SUMMARY OF THE INVENTION

The object of this invention therefore is the production of a multi-purpose magneto-motive bistable relay switch of simple but effective design that can be manufactured in any size and which would retain its fast switching characteristics without the need of readjustment.

This object has been attained due to the construction of a free floating ferro-magnetic contactor disposed within a magnetically and electrically non-conductive contact container embodying at least one pair of contact points. The contact container is rigidly mounted parallel between two rigidly mounted bridge type permanent magnets of high magnetic retentivity such as cobalt rare-earth type, the magnets facing each other with reciprocal magnetic poles thus forming a fully closed ring flux field which cannot be demagnetized under the given conditions. An electro-magnetic coil encircles the contact container and upon energizing, the coil magnetically polarizes the ferro-magnetic contactor which is thereupon repelled by the like poled magnet and attracted by the unlike poled magnet thus executing a bistable switching operation by establishing a dridging relationship with the contact points.

The coil generates a magnetic flux field perpendicular to the air path of the ring flux field of the spaced permanent magnets and thus magnetizes one permanent magnet per switching mode thereby keeping the permanent magnets at their magnetic saturation point and preventing a possible degradation of magnetic field strength due to extensive switching or duration of usage. These characteristics render possible the manufacture of miniature bistable relay switches of approximately one-eighth of an inch diameter applied as miniature bistable flip-flop switch, memory bit, trip circuit switch, etc. Such miniature relay switches assembled together with terminal plug-in units according to a pre-programmed matrix would facilitate the construction of simple control and computer units where high switching times are not essential. Such a computer or control unit is devoid of transistors, resistors, capacitors, modulators, tubes, semiconductors, amplifiers, rectifiers, etc., consisting only of a low voltage dc power supply, keyboard, display unit and the miniature relay switches.

The programming or reprogramming of the computer unit is accomplished by simply manually restacking the miniature relay switches or by applying general computer programming techniques. The invention will become apparent from the following detailed description of an embodiment thereof taken with reference to the drawings wherein:

DETAILED DESCRIPTION OF A PREFERRED EMBODIMENT

Figure 1:
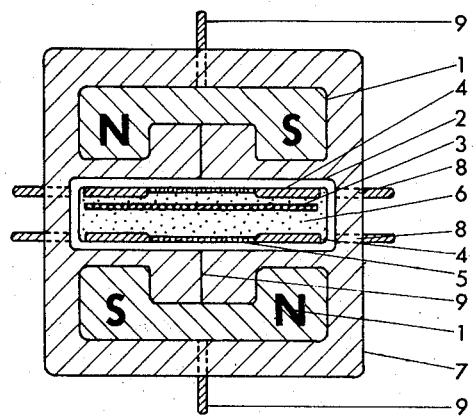
FIG. 1 shows a Multipurpose Magneto-Motive Bistable Relay Switch according to the instant invention.
Figure 2:
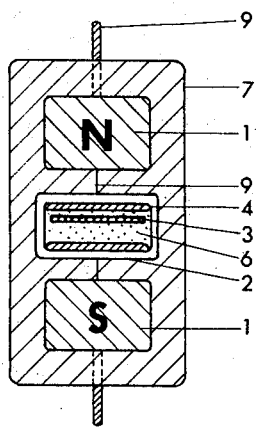
FIG. 2 shows a side view of the switch.
Figure 3:
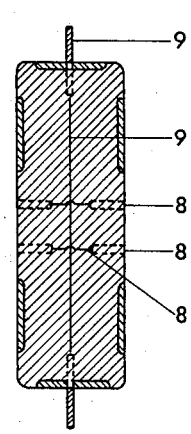
FIG. 3 shows a terminal plug-in connector unit joining the terminals of the contact points of the switch of the instant invention.
Figure 4:
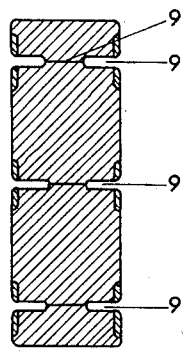
FIG. 4 shows a terminal plug-in connector unit joining the terminals of the coil of the switch of the instant invention.

As illustrated in FIGS. 1 and 2 a switching device according to the invention includes, two bridge type permanent magnets 1 mounted rigidly within the switch housing 7 of the switch, spaced apart and facing each other at a given distance with reciprocal magnetic poles thus forming a fully closed ring flux field that cannot be demagnetized under the following given conditions. A hermetically sealed electrically and magnetically non-conductive contact container 2 embodying at least one pair of oppositely poled electrical contact points 4 spaced apart and mounted on the end-portions of the interior wall surface of the contact container 2 each contact point 4 being electrically connectable exteriorly of the switch housing 8 and 9 by a terminal plug-in connector unit, as shown in FIGS. 3 and 4.

The contact container 2 also embodies a free floating electrically conductive ferro-magnetic contactor 3 for the purpose of establishing bridging relationships between the contact points 4 disposed within the contact container 2. An electro-magnetic coil 5 encircles the midsection of the contact container 2 so that the encircling coil 5 and the contact container 2 are disposed rigidly parallel between the two permanent magnets 1 facing each other with the reciprocal magnetic poles thus forming a fully closed ring flux field. The coil 5 responding to an electrical dc trigger pulse generates a magnetic flux field perpendicular to the air-path of the ring flux field at the spaced apart permanent magnet's poles and thus enters the respective anti-polar magnet thereby magnetizing one permanent magnet per one selective switching mode thus preventing degradation of the magnetic field strength during frequent switching. The free floating ferro-magnetic contactor 3 responds to the magnetic flux field generated by the electrical dc trigger pulse in the electro-magnetic coil 5 by being magnetically polarized and thereupon simultaneously repelled by the like poles of the one permanent magnet and attracted by the unlike poles of the other permanent magnet respectively. In this manner under the magnetic force of attraction of the permanent magnet, bistable switching operations are executed within the contact container 2 by establishing a bridging relationship between at least one pair of spaced apart electrical contact points 4 having opposite polarity. The energization of the electro-magnetic coil 5 by a current flowing in the opposite direction reverses the switching operation. The switch is fully directionally independent due to the high force of magnetic attraction of the permanent magnet and will remain in the bridging relationship with the contact points 4 until an electric trigger pulse energizes the electro-magnetic coil 5 thus reversing the switching operation. Due to the high magnetic repelling and attracting forces of the permanent magnets 1 during the switching operations very high switching times in the milli seconds range are obtainable. For the switch to function as a bistable relay switch, flip-flop switch, memory bit, trip circuit switch, coil 5 and contact points 4 are to be circuited individually thus rendering possible selective switching operations.

For the switch to function as a very sensitive dc overload circuit, breaker coil 5 and contact points 4 are simply connected in series. Thus an increase in electrical current flowing through the coil and the contact points will also increase the magnetic flux of the coil thereby magnetically polarizing the ferro-magnetic contactor 3 which is thereupon not attracted but repelled by the holding magnet and attracted by the oppositely poled permanent magnet. For the switch to function as a very sensitive dc overload circuit breaker, the contact points 4 are to be spring-suspended to permit the ferro-magnetic contactor 3 to move into the magnetic field of the opposing permanent magnet or a contactor with magnetic retentivity is to be used. To render possible the construction of simple computer and control units the switches are assembled together with the application of the terminal plug-in connecter units FIGS. 3 and 4. To minimize electrical arcing within the contact container during switching operations an arc extinguishing medium 6 is used therein.

It will be understood that the various embodiments herein disclosed are by way of example only, and it should be understood that the present inventive concept is not limited thereto and further modifications of the invention may be made without extending the scope thereof.

The embodiment of the invention in which an exclusive property or privilege is claimed is defined as follows:

1. A magneto-motive bistable relay switch having a switch housing and comprising: means for rigidly mounting at least two permanent magnets within said switch housing so that the poles of one magnet face the poles of the other at a given distance therebetween, said facing poles being of opposite magnetic polarity thus forming a fully closed ring flux field that cannot be demagnetized under a given condition of operation of said switch; contact container means disposed in said switch housing said container means being hermetically sealed and electrically and magnetically nonconductive said contact container means having an interior and exterior wall surface and at least one pair of electrical contact points spaced apart and mounted on the end-portions of said interior wall surface of the said contact container means each of said contact points being electrically connectable exteriorly of said means by a terminal plug-in connector unit;

electro-magnetic coil means encircling said hermetically sealed contact container means substantially at its mid-section thereof, one pair of contact terminals of said coil means being electrically connectable exteriorly on said switch housing by a terminal plug-in connector unit said coil means and said contact container means being disposed rigidly parallel between said two permanent magnets, said coil being responsive to an electrical dc trigger pulse which generates a magnetic flux field perpendicular to the air-path of said ring flux field;

electrically conductive free floating ferro-magnetic contactor means disposed within said hermetically sealed contact container means said contactor means being operatively responsive to the magnetic flux field generated by said electrical dc pulse in said electro-magnetic coil means whereby said contactor means is magnetically polarized and simultaneously repelled by the like poles of one of said two permanent magnets and attracted by the unlike poles of the other of said two permanent magnets respectively thereby executing a bistable switching operation within said contact container by establishing a bridging relationship between at least one pair of said contact points having opposite polarity.

2. A bistable relay switch as claimed in claim 1 wherein said at least two permanent magnets mounted rigidly within the switch housing are of a cobalt rare-earth type.

3. A bistable relay switch as claimed in claim 1 wherein said switch housing has clamp screw terminals embodying binding screws disposed therein to render possible electrical connection with said switch using wire leads.

4. A bistable relay switch as claimed in claim 1 wherein said contact container means has an arc extinguishing medium disposed therein.

5. A bistable relay switch as claimed in claim 1 wherein said switch housing is composed of magnetically and electrically nonconductive plastic.

6. A bistable relay switch as claimed in claim 1 wherein said hermetically sealed contact container means is composed of magnetically and electrically non-conductive glass.

7. A bistable relay switch as claimed in claim 1 wherein said electrically conductive free floating ferromagnetic contactor means has an electrically conductive surface coating.

8. A bistable relay switch as claimed in claim 1 wherein said at least one pair of contact points are mounted on a spring suspension.

9. A bistable relay switch as claimed in claim 1 wherein said plug-in connector unit which exteriorly connects the electro-magnetic coil terminals, and said plug-in connector unit connecting with said contact points are dissimilar in type.

10. A bistable relay switch as claimed in claim 1 and further comprising a single plug-in contact unit which connects the terminals of both said coil means and said contact points.

11. A bistable relay switch as claimed in claim 1 wherein said coil means and said contact points have individual electric circuits thus rendering possible selective switching modes of said switch.

12. A bistable relay switch as claimed in claim 1 wherein said coil means and said contact points are series connected so that said switch may be used as a sensitive dc overload circuit breaker, said coil means being activated by an additional circuit means which resets said overlaod circuit breaker.

* * * * *